United States Patent [19]
Kaun

[11] Patent Number: 5,219,673
[45] Date of Patent: Jun. 15, 1993

[54] CELL STRUCTURE FOR ELECTROCHEMICAL DEVICES AND METHOD OF MAKING SAME

[76] Inventor: Thomas D. Kaun, 320 Willow St., New Lenox, Ill. 60451

[21] Appl. No.: 748,857

[22] Filed: Aug. 23, 1991

[51] Int. Cl.⁵ .............................................. H01M 2/18
[52] U.S. Cl. ...................................... 429/32; 429/94; 429/146; 429/152; 29/623.3
[58] Field of Search ................... 429/32, 94, 142, 146, 429/152; 29/623.3

[56] References Cited
U.S. PATENT DOCUMENTS

| | | | |
|---|---|---|---|
| 4,051,304 | 9/1977 | Snook | 429/94 |
| 4,687,717 | 8/1987 | Kaun et al. | 429/152 |
| 4,889,777 | 12/1989 | Akuto | 429/94 X |

Primary Examiner—Stephen Kalafut
Attorney, Agent, or Firm—Charles F. Lind

[57] ABSTRACT

An electrochemical device comprises a plurality of cells, each cell including a laminate cell membrane, made up of a separator/electrolyte means interposed between alternating positive and negative electrodes, each type of electrode being respectively in common contact to a single current collector.

20 Claims, 4 Drawing Sheets

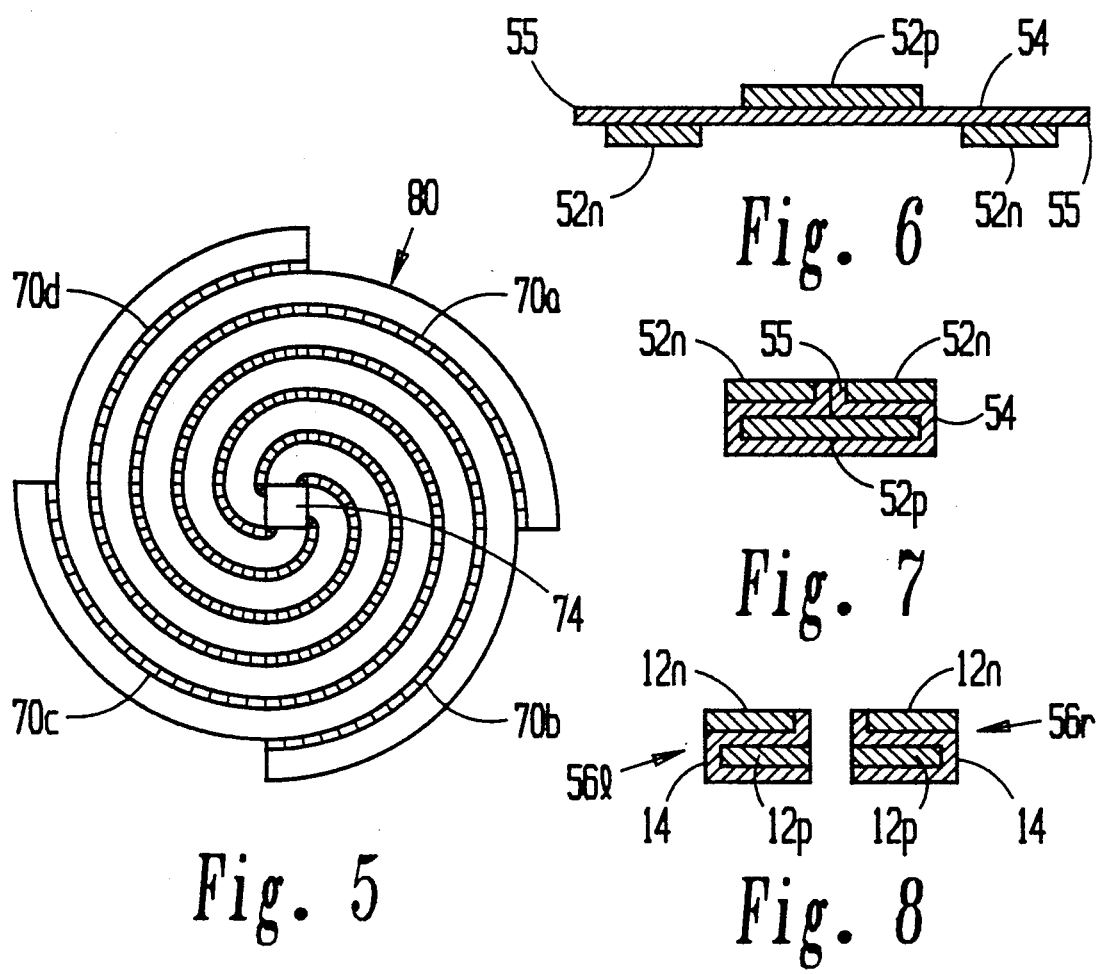
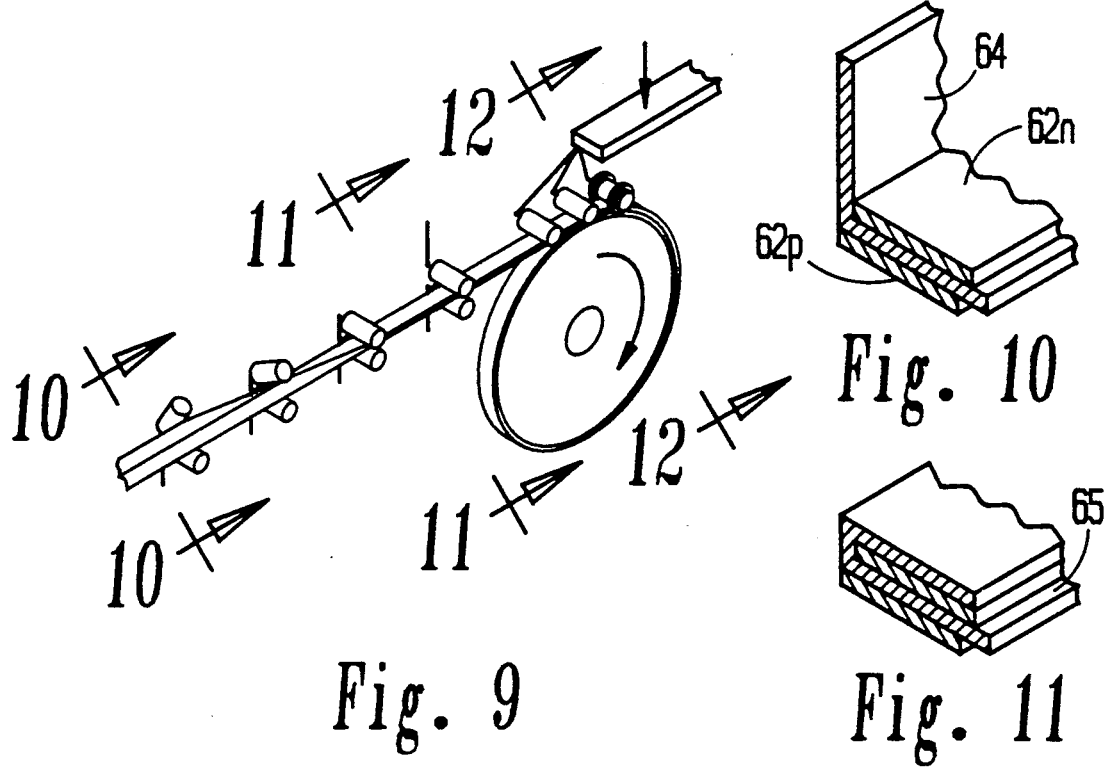

CELL STRUCTURE FOR ELECTROCHEMICAL DEVICES AND METHOD OF MAKING SAME

BACKGROUND OF THE INVENTION

An electrochemical device comprised of cathode and anode electrodes physically exposed to an electrolyte may benefically be used to convert between chemical and electrical energies. Housing means enclose these electrode and electrolyte components, and may even seal them from the atmosphere.

Batteries, fuel cells and capacitors are but a few such specific electrochemical devices to which this invention relates.

As the electrical capacity in terms of voltage and/or amperage of each pair of cathode and anode electrodes (or cell) is generally small, many separate pairs of cathode and anode electrodes or cells may be used in a single housing means. Current collectors are generally used to electrically interconnect the cells, in parallel and/or in series, to provide usable voltage and amperage outputs at exposed terminals on the electrochemical device.

The electrochemical device performs usable work when ions pass between the electrodes of each cell via the electrolyte, and when electrons concurrently pass through each cell via the electrodes. The generated voltage per cell is predetermined by the electrochemical reaction of the component materials used, and the generated amperage and/or power available is dependent on the configurations and masses of these active components.

The specific output energy of the device may be provided in terms of watts-hours per device weight, and the specific output power of the device may be provided in terms of watts per device weight. Output values of existing electrochemical devices are typically small fractions of theoretically possible output values, because of internal resistances and other inefficiencies.

The resistance to ion-conduction between the electrode elements is one major source for internal power loss. Such resistance, R, may be theoretically determined with the expression $$R = \rho l / A,$$

where:
- "$\rho$" is the impedance value of the electrolyte;
- "l" is the thickness of the electrolyte; and
- "A" is the interfacial contact area between the electrode elements and electrolyte.

The ion-impedance value, $\rho$, is not easily subject to modification and is not effective as a design parameter. Designers of electrochemical devices thus strive to reduce the electrolyte thickness "l", and to increase the interfacial contact area "A" between the electrode elements and the electrolyte.

Different configurations of the cathode and anode electrodes, electrolyte separation, and the current collectors are disclosed in the following patents.

U.S. Pat. No. 1,510,364 zig-zagged a cathode electrode band to define separate compartments for holding electrolyte, and inserted elongated rod-like anode electrodes into the electrolyte spaced from the cathode electrode. The interfacial contact area "A" effectively is less than the overall surface area of the anode rods, as some rods oppose one another rather than the cathode. U.S. Pat. Nos. 2,157,629 and 2,851,509 each generally zig-zagged a folded separator band to define opposing compartments for holding and isolating plate-like cathode and anode electrodes, with electrolyte engulfing all of these components. U.S. Pat. No. 4,029,855 formed each cell with C-shaped electrodes and a Z-shaped separator sandwiched therebetween. U.S. Pat. No. 4,048,397 folded a separator band having electrically conductive surfaces, and sandwiched separate sets of respective plate-like cathode and anode electrodes between the separate oppositely facing folds. U.S. Pat. Nos. 2,665,325; 3,410,726; 4,664,989 and 4,668,320 illustrated "jellyroll" cell constructions each formed by coiling a preformed assembly of cathode and anode electrodes and a separator on itself, to yield a right cylindrically shaped electrochemical device. These cell arrangements, with the face-to-face electrodes and sandwiched electrolyte and separator structures, increased the interfacial contact area "A" between the electrodes.

However, the very breadth of the facing electrodes and sandwiched electrolyte and separator, raise another cause of concern, namely each's structural sufficiency during assembly and during operation, to maintain and support the electrode elements physically separated. This includes withstanding thermal expansion and contraction forces of the cell components during operational temperature changes. Increasing the thickness of the sandwiched electrolyte and separator to provide needed strength and/or durability also increases the ion-conducting electrolyte thickness "l", offsetting benefits obtained by increased interfacial contact area "A".

Current collection means used in these cell arrangements add significant weight, and thus reduced specific cell energy and power outputs. For example, isolated conductors are generally connected to the electrodes and routed along extended paths independently of the electrodes to the external terminals. These conductors must carry the full cell current, and thus must be of sufficient mass and cross-section to keep internal resistance manageably low.

Also, these cell arrangements provide electrodes of limited size and/or thickness, limiting the quantities of usable electrode materials and thus limiting maximum cell storage energy and/or operating cycle-life (for recharagable cells).

The dilemma of these designs is that power gains obtained by increasing the interfacial electrode area "A" across the electrolyte generally are typically offset by increased electrolyte thickness "l", and the weight and volume of the current collectors reduce specific energy and power outputs. Power can be increased, but only at the expense of reduced energy storage capacity per weight and volume and at increased costs due to needed additional hardware. High interfacial area "A" of the spirally wound "jellyroll" configuration merely trades off usable power against the energy density; but minimum separator thickness is needed for cell durability and cycle-life.

Existing bipolar cell arrangements do not escape this power and energy trade off dilemma; nor do fuel cell electrochemical devices.

Fuel cell designers also attempt to maximize interfacial area for increased power density, and the all-ceramic solid oxide fuel cell is promising. Interfacial thermal expansion problems associated with the 1000 degree C. operating temperatures needed to achieve ion conduction via the solid remain a design concern, but the use of thin layered components seems promising, so long as the layered components bond together and have matched thermal expansion coefficients. It would seem likely that if electrolyte layers can be fabricated thin enough in forming the device, electrolyte materials of marginal ion-conductivity could possibly even be used as a viable option; and the reduced resistance may well even lower the overall operating temperatures of the device.

Fuel cell designers moreover must effectively manifold fuel, oxidant and exhaust gases to and from the electrochemical interfaces, to yield the production of the electrical and thermal energies. The gas flow, turbulence, and exchange rates in part determine the chemical activity of the fuel and oxidant gases at the interfaces, and the resulting outputs and efficiencies. Fuel cell voltage decreases rapidly as chemical activity of the fuel becomes less than 5% of the fuel gas; whereby flow rate designs typically attempt to yield 80-90% fuel consumption. Nonetheless, overall energy efficiency may be reduced because of large pressure drops between the gas flow inlets and outlets.

SUMMARY OF THE INVENTION

This invention relates to improved constructions for electrochemical devices, such as batteries, capacitors, fuel cells, sensors or the like, and specifically to constructions for providing high specific power and energy outputs, per weight and volume of the device.

A basic object of this invention is to provide an improved cell arrangement involving the orientation of positive and negative electrodes, interpositioned separator and/or electrolyte, and current collectors used in making up the electrochemical device.

The improved cell arrangement uses a basic laminate cell preassembly comprised of alternatively arranged generally parallel positive and negative electrodes, and a separator and/or electrolyte formed of a very thin ionic-conductive ribbon-like layer configured in a tight serpentine manner and physically interposed between the electrodes. This basic laminate cell preassembly is layered on itself, such as by winding or coiling it as a spiral to form a laminate cell membrane, in the general shape of a flat disc and the cell membrane is sandwiched between plate-like current collectors with the electrode interfaces primarily perpendicular to the current collectors, to make up an electrochemical cell. Adjacent electrochemical cells can likewise be built up, with a plate-like current collector between each adjacent pair of cell membranes, for defining a bipolar electrochemical device.

The invention also provides for adding positive or negative electrode material, as discs, adjacent and between the cell membrane face having the exposed corresponding electrode material and the current collector, suited to define reservoirs of electrode material proximate the cell electrodes.

The invention also provides an electrochemical fuel cell construction and arrangement comprised of manifolding and gas passage means disposed adjacent the cell membrane disc and formed proximate the electrode elements by the adjacent face of the cell membrane and/or by highly porous electrodes, and by orienting the gas-flow passages radially, between exterior and interior axial manifolding, for yielding reactant gas distribution assisted by natural convection as in a chimney effect.

The invention also provides a method of making the improved cell construction and its electrochemical devices.

BRIEF DESCRIPTION OF THE DRAWINGS

Further objects, advantages and features of the present invention will appear from the following disclosure and description, including as a part thereof the accompanying drawing, in which:

FIG. 5 is a facial view similar to FIG. 2, except of an alternate embodiment;

FIGS. 6, 7 and 8 are sectional views of the components making up the basic cell preassembly of FIG. 1, sequentially arranged to illustrate a first mode of forming the cell preassembly;

FIG. 9 is a perspective view of apparatus using a second mode for forming the cell preassembly and also for winding it to the configuration of FIG. 2;

FIGS. 10 and 11 are enlarged perspective views, showing the components as formed generally at lines 10—10 and 11—11 in FIG. 9;

DETAILED DESCRIPTION OF ILLUSTRATED EMBODIMENTS

Figure 1:
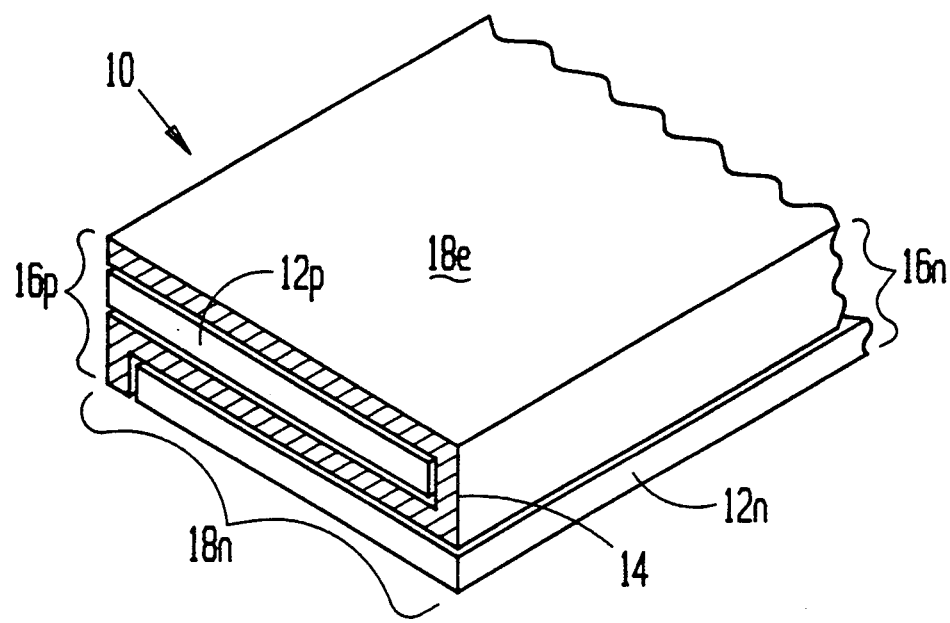
FIG. 1 is a cut-away perspective view of a basic cell preassembly suited for forming an electrochemical device according to this invention.

The enlarged cut-away perspective view of FIG. 1 illustrates a cell preassembly 10 suited for forming, with slight possible modifications, an electrochemical device such as a battery, fuel cell, sensor or capacitor. The cell preassembly 10 specifically includes alternatively arranged generally parallel positive and negative electrodes 12p and 12n, and a separator or electrolyte 14 interposed therebetween somewhat in the form of a laminate structure. In this disclosure, the terms anode and cathode will also be used for the electrodes, somewhat interchangeably, as well as the terms separator and/or electrolyte.

The laminate cell preassembly 10 has a substantially rectangular cross-section, with opposing sides 16p and 16n, and opposing sides 18e and 18n. The negative electrode 12n entends to and along part of the sides 16n and 18n, the positive electrode 12p entends to and along part of the side 16p, and the separator or electrolyte 14 defines the entire side 18e and completes the remainder of the sides 16n, 18n and 16p. The laminate cell preassembly 10, with this cross-section, would be elongated indefinitely.

As the preferred embodiments of the inventive electrochemical devices are related to the "jellyroll" configuration, the laminate cell preassembly 10 would be layered or coiled on itself, such as into a spiral (see FIG. 2), with the negative electrode side 18n of one turn being snugged against the separator or electrolyte side 18e of the adjacent turn, to have the electrolyte side 18e facing out. The sides 16p and 16n would be generally aligned, so that the coiled adjacent cell preassemblies 10a, 10b, 10c, etc., in effect would form a laminate cell membrane disc 20 extended in the direction generally transverse or even perpendicular to the elongated directions of the electrodes 12p and 12n. Inner center core 14c of insulating material or separator or electrolyte material could be used to start the coil, so that the cell membrane would have no intermediate voids or gaps.

Each unitary cell membrane 20, 20a, 20n etc. would be. sandwiched (see FIGS. 3 and 4) between adjacent current collectors 24, 24a, 24b, etc., and layers 22p and 22n of materials similar to those respectively forming the positive and negative electrodes 12p and 12n would preferably be sandwiched between the adjacent current collector and the cell membrane on its side thereof with the exposed corresponding positive or negative electrode.

Each unitary cell membrane 20 etc. and its sandwiching layers 22n and 22p of electrode material and current collectors 24 etc. would thus comprise a cell 25, 25a, 25n, etc. of the electrochemical device. In each cell, the open end of each respective electrode 12p and 12n is electrically common with its adjacent layer 22p and 22n of similiar electrode material; while the opposite closed end of each respective electrodes is separated or electrically isolated from the layer 22n and 22p of the opposite electrode material by the separator or electrolyte 14. The cell membrane 20, etc. crosses the cell 25, etc. in a generally radial direction, substantially parallel to the current collectors 24, etc.; and the separator or electrolyte 14 therein assumes a very serpentine configuration flattened to extend primarily in the axial direction and transverse to the current collectors and comprised mostly of portions disposed generally axially and of smaller portions disposed radially.

Figure 3:
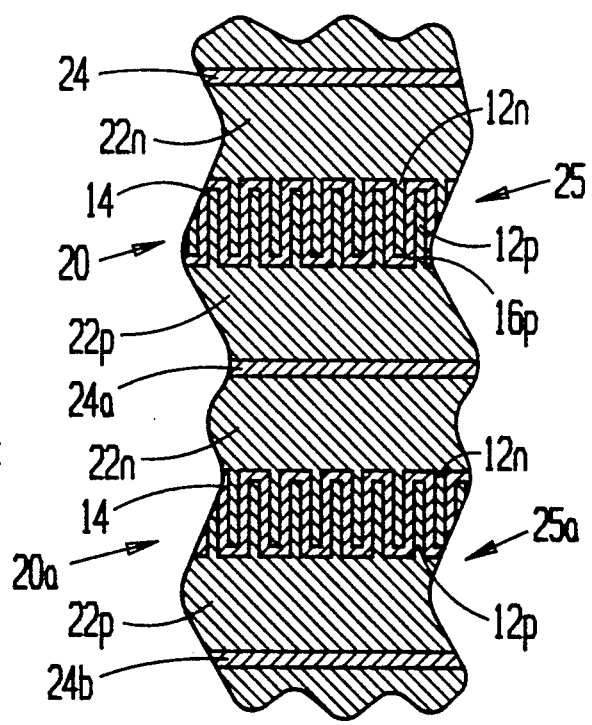
FIG. 3 is an enlarged sectional view taken generally from line 3—3 in FIG. 2, except shown adjacent cell membranes arranged as adjacent cells in an electrochemical device formed according to this invention.
Figure 4:
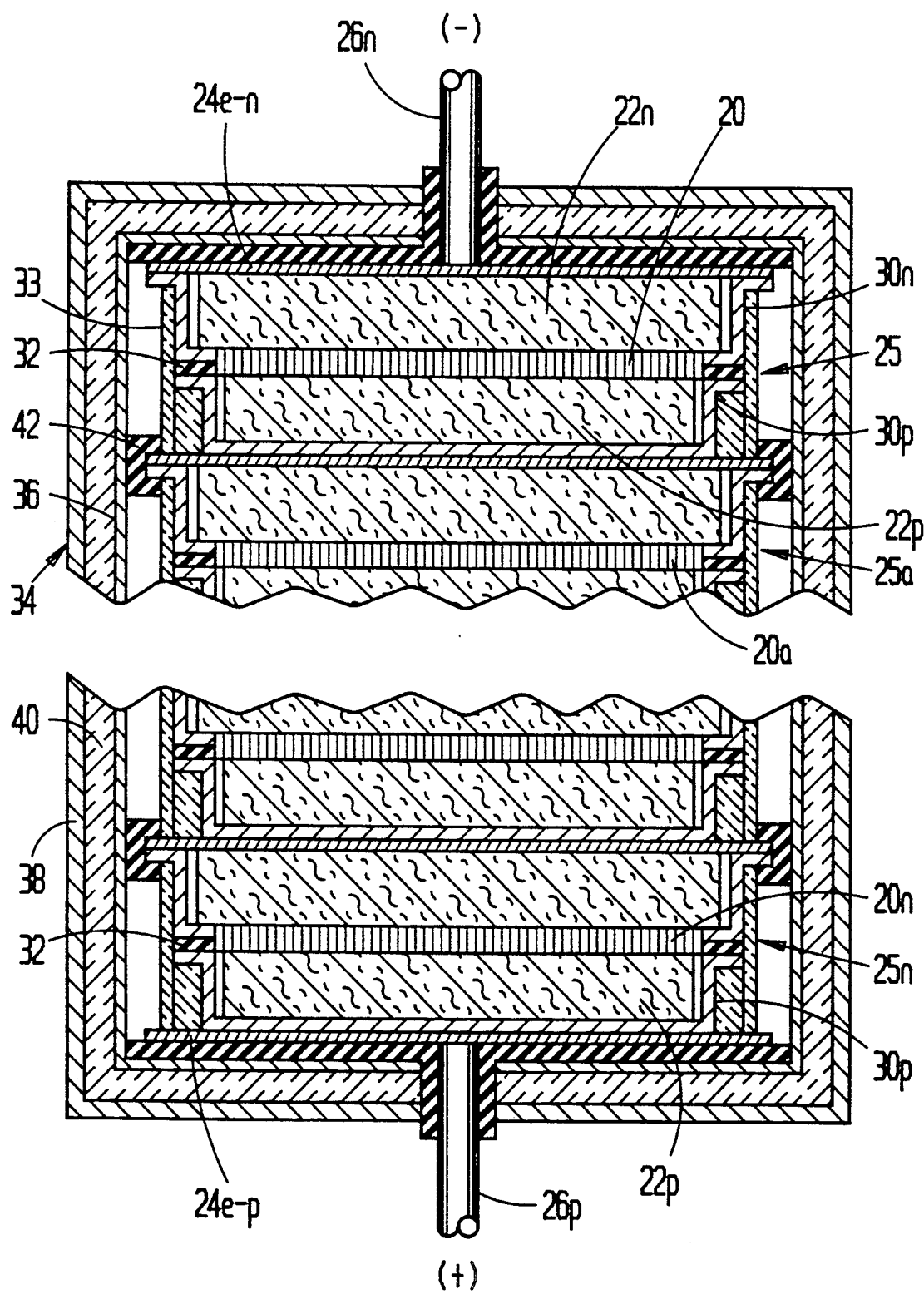
FIG. 4 is a longitudinal center section of a bipolar electrochemical device incorporating the cell configruation of this invention.

Many individual like unitary cell membranes 20, 20a, 20n, etc, are provided in a preferred electrochemical device as illustrated in FIGS. 3 and 4. The paired electrodes 12n and 12p of every layer of the cell preassembly, and the electrically common adjacent electrode layers 22n and 22b in every unitary cell membrane 20, etc. provide a common cell voltage output and a cumulative current output, at the sandwiching current collectors of the cell membrane. The illustrated intermediate current collectors 24, 24a, 24b, etc. are bipolar in nature, each having its opposite faces contacting the positive and negative electrode material layers 22p or 22n of the adjacent cells. The endmost current collectors 24e–p and 24e–n (see FIG. 4) are connected to terminals 26p and 26n, to provide for external connection of the electrochemical device to exterior devices (not shown).

A suitable containment is disposed around these cell components, to isolate the positive and negative electrodes 12p and 12n and electrode material layers 22p and 22n electrically from one another, to hold the electrolyte or separator 14, and to electrically isolate the current collectors as required. The unit illustrated in FIG. 4 is patterned after my copending application Ser. No. 07/628,638, filed Dec. 15, 1990, now U.S. Pat. No. 5,162,172 entitled Bipolar Battery, and this application is incorporated herein by reference.

Thus, each cell 25, etc. is substantially sealed, by the adjacent current collectors 24, etc., by electrically conductive cup-like forms 30p and 30n disposed around the periphery of the positive and negative electrode material layers 22p and 22n of the cells, by an insulator 32 around the periphery of the cell membrane 20 and interposed between the forms 30p and 30n, and by an insulator/seal 33 around the forms 30p and 30n and around the insulator 32. The stacked cells are sealed in housing 34, having inner and outer walls 36 and 38 separated by thermal insulation 40. Insulating spacers 42 fit between the inner housing wall 36 and the peripherial edge of each cell.

In the illustrated electrochemical battery device 10, the separator/electrolyte 14 is of an ionic conductive material; the positive and negative electrodes 12p and 12n are of both ionic and electronic conductive materials; and the adjacent current collectors 24, etc. are of electronic-conductive material. The actual materials of these components would depend on the type of electrochemical battery.

The illustrated positive and negative electrodes 12p and 12n have surface configurations generally opposed to one another and extended in axial directions primarily transverse to the paired current collectors, and the separator/electrolyte also follows a serpentine configuration having portions generally elongated in the axial direction transverse to the paired current collectors. The electrodes thus overlap primarily along regions that are generally thin and ribbon-like, flattened and extended in the axial direction generally normal to the sides 16p and 16n of the preassembly, or to the cell membrane 20 and adjacent current collectors 24, etc. The positive and negative electrodes are alternatively arranged across the cell membrane, and respectively are electrically common with only one of the paired current collectors.

This cell configuration offers interfacial area (similar to that identified as "A" in the above algorium) between the adjacent positive and negative electrodes that is comprised of: (1) the transverse regions between the closed end of each electrode and the opposite polarity electrode material layer; and (2) the overlapping axial regions between the opposed electrodes, of each cell preassembly and adjacent cell preassembly. The total interfacial area contributed by the transverse regions (1) of the electrodes will be the overall transverse planar area of the cell (or approximate facial area of a current collector), a fixed amount, reduced by the approximate total area of either the positive or negative electrodes. On the other hand, the total interfacial area contributed by the axial regions (2) may be a significaly higher multiple, depending only on the electrode proportions In a typical preferred preassembly 10, the opposing sides 16p and 16n may be spaced apart by a width less than 3 mm and the opposing sides 18e and 18n may be spaced apart by a height between 0.1-1.0 mm. As the preassembly height is comprised of the thickness of both electrodes and twice the thickness of the separator/electrolyte, the individual thickness of these components may understandably be less than 0.1 mm. The preferred width-to-height ratio of a cell preassembly more specifically will be between being approximately square and being very flattened (at ratios such as between 1-to-1 and 30-to-1).

The total interfacial area contributed by the axially overlapped electrode regions (2) may thus be made thirty times the total interfacial area contributed by transverse regions (1), and accordingly, this cell configuration can provide perhaps thirty times more electrode-interface area than the simple area of adjacent planar current collector. When in a preferred cell, the approximate thickness of a cell membrane 20 may be very small, such as possibly less than 3 mm, while the thickness of the separator/electrolyte interposed between the electrodes is likewise very small, such as less than 0.1 mm.

Usable work in the illustrated electrochemical device occurs when ions are transferred between the positive and negative electrodes 12$p$ and 12$n$ via the separator/electrolyte 14, and concurrently when electrons are passed via the electodes and the adjacent electrode material layers between the sandwiching current collector 24.

The majority of electron transfer takes place in the axial direction along the flattened electodes and the adjacent electrode material layers, or normal to the current collectors. As noted above, the positive and negative electrodes 12$p$ and 12$n$ are electrically continuous at opposite open ends thereof respectively with the positive and negative material layers 22$p$ and 22$n$ of each cell. Resistance to electron passage via the electrodes will generally be negligible compared to ionic resistance. The sandwiching electrode material layers 22$p$ and 22$n$ can be made with thicknesses to suit the purpose of the electrochemical device, where the thicker presence adds to the capacity of the electrochemical device.

The electron passage through the intermediate current collectors 24, etc. is in the axial direction transverse thereto, so these components can be of thin, lightweight electrically conductive construction. Internal resistance due to the current collectors will also be negligible compared to ionic resistance.

The majority of ion transfer will take place via the interfacial area "A" between the axially extended adjacent overlapping paired electodes 12$p$ and 12$n$, in a radial direction and substantially parallel to the current collectors 24. Some ion transfer will take place also axially between the closed ends of the electrodes and the adjacent opposite electrode layers. The large interfacial electrode area "A", compared to the cross-section of the cell, reduces internal resistance against ion transfer in the electrochemical device.

Another advantage of the disclosed cell orientation relates to its durability, and thereby allows the separator/electrolyte 14 to be made with a very small thickness "l", for further reducing the ion resistence. This is possible in part because the overall length of overlapping electrodes in the cell preassembly 10 is small, such as less than 3 mm, whereby the separator/electrolyte 14 need structurally separate the electrodes across only these short overlapping lengths. This is possible also because the cell preassembly 10 is initially fabricated and then coiled onto the cell membrane 20, or the cell preassembly 10 is fabricated on and as part of forming the cell membrane 20. Moreover, the short electronic current flow paths along the lengths of the electrodes (less than 3 mm) do not require any additional current collectors supplementing or paralleling the electrodes, allowing the electrode structures and the separator/electrolyte 14 to be made of substantially uniform thicknesses.

The disclosed electrochemical device configuration minimizes the mechanical load the separator/electrolyte 14 must support during the cell formation, and thereafter under normal usage; and moreover provides very high specific output energy and specific output power, compared to known electrochemical devices.

The cell preassembly and/or cell membrane can be formed by adapting otherwise conventional techniques. The materials for the electrodes or separator/electrolyte may be available in a flexible or pliable form, to extrude and wind as thin ribbons. The component material may also be available as a liquid, or as a powder to be mixed and fluidized with a binder/solvent system, which could be extruded or selectively tape cast or painted by stencil where needed. Powders may be very fine (1–10 microm size) and when mixed may make up 60–90% by weight of the mixture, the binder/solvent making up the balance (preferably about 20%). Binders may be selected from a group including polyisobutylene, polyvinyl alchol, and thermal setting resin that may decompose by depolymerization. A plasticizer such as butyl benzol thalate may also be added to allow the material to be mechanically worked (rolled, corrugated, extruded) at low temperatures. The component materials may possibly be applied directly by flame spraying (plasma sputtering) for forming the intended ceramic and/or metallic layers.

One preferred manner of forming the basic cell preassembly 10 is illustrated in FIGS. 6–8. The individual components thereof are separately formed, as by commerically available thin ribbons, by extrusions or by tape castings, as continuous flattened ribbon-like elements including the positive electrode element 52$p$, the negative electrode element 52$n$, and the separator/electrolyte element 54. The ribbon-like elements are positioned relative to one another as indicated in FIG. 6, with the positive electrode element 52$p$ on one side of the separator/electrolyte element 54 and with two negative electrode elements 52$n$ on the other side of the separator/electrolyte element and outwardly spaced from the positive electrode element 52$p$. The single positive electrode element 52$p$ may be approximately twice the width of the intended overlap length of the positive electrode 12$p$, and each negative electrode element 52$n$ may be approximately the width of the intended overlap length negative electrode 12$n$.

The protruding ends 55 of the separator/electrode 54 may then be folded down to cover the ends of the negative electrode elements 52$n$, and the separator/electrolyte 54 and the negative electrode elements 52$p$ may together then be folded up and over the positive electrode element 52$p$, to the position of FIG. 7. Thereafter, a slicer (not shown) can sever the assembly in half, resulting in two cell preassemblies 56$l$ and 56$r$, as mirror images of one another. The leftward cell preassemblies 56$l$ can be rotated 180 degrees to appear the same as the cell assembly 10 illustrated in the preceeding figures.

FIGS. 9–11 and 12$a$–12$c$ illustrate another manner of forming the cell preassembly 10, and also of rolling it immediately thereafter on itself to form the cell membrane 20. The continuous flattened ribbon-like elements, including the positive electrode element 62$p$, the negative electrode element 62$n$, and the separator/electrolyte element 64, are feed concurrently together with the electrode elements sandwiching the separator/electrolyte element near one side edge thereof. Thereafter, the free adjacent side on the separator/electrolyte element 64 is folded up and over the negative electrode element 62n, to the preassemby configuration of FIG. 11.

The preassembly is then wound on underlying layers of itself, as illustrated in FIGS. 9, and 12a, 12b and 12c. Heated roller and/or stylus means 66 may fold the protruding edge 65 of the separator/electrolyte element 64 down over the end of the positive electrode element 62p and seal the separator/electrolyte elements of adjacent layers together to define a coiled cell membrane. Appropriate binders/sealant may likewise be applied to this layer interface by the heated means 66 or other means (not shown). The separator/electrolyte 64 seals with the underlying adjacent separator/electrolyte layer 64u, and effectively closes the right ends of the positive electrodes 62p (as referenced in FIGS. 12b and 12c), to have them open only to the left; whereas the negative electrodes 62n open only to the right.

In forming the cell membrane 20 in the disclosed manners, the ribbon-like electrode elements and the separator/electrolyte element are pliant, generally composed of the specific active material of the electrodes or separator/electrolyte embedded in a polymer matrix. The coiled cell membrane of FIG. 12c can further be compressed slightly radially and axially, between rollers or the like (not shown), to establish and/or assure firm contact between the components of the cell preassembly and winding layers of adjacent cell preassemblies. Thermal treatment at elevated temperatures and possibly in a special atmosphere can then be used to depolymerize the binder and to sinter the coiled cell membrane when cooled into a substantially rigid or at least self-supporting single disc.

Guides and other support structures have not been illustrated in FIGS. 6-11 and 12a-12c, for they would be standard and their presence would only complicate the illustrations.

Also while not specifically illustrated, it would also be possible and quite attractive where very thin layers of the components are to be made and used, to paint, stencil or spray the components including the positive and negative electrodes and separator/electrolyte on one another sequentially as strips, such as while moving on a belt or while being wound on a mandrel or the like. Under such a sequence: (1) negative electrode material may be applied over the underlying substrate along a slightly lesser width strip than the cell preassembly, leaving a minute nonapplied gap at one side edge thereof; (2) separator/electrolyte may be applied as a full width strip, over the negative electrode material and filling in also the one side edge gap; (3) positive electrode material may be applied over this separator/electrolyte strip along a slightly lesser width strip than the cell preassembly, leaving a minute nonapplied gap of the separator/electrolyte strip at the opposite side edge thereof; (4) separator/electrolyte may be applied over a full width strip, filling in also the opposite side edge gap; and repeating steps (1-4) again as needed for the cell membrane buildup.

Figure 2:
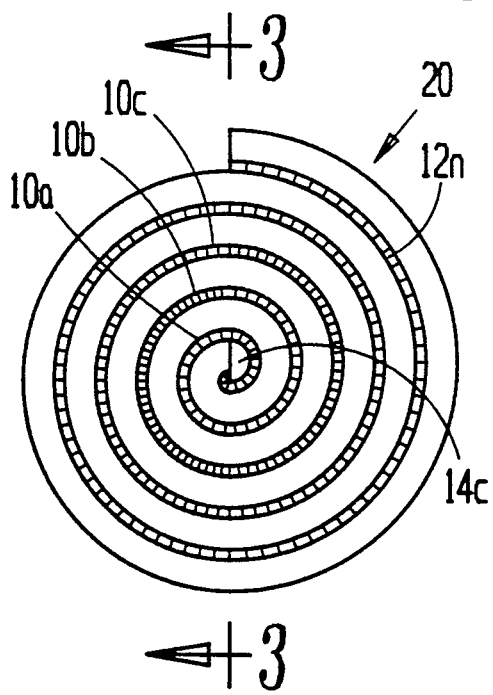
FIG. 2 is a right side facial view, at a reduced scale, showing the cell preassembly of FIG. 1 coiled on itself to define a laminate cell membrane of the type suited for forming an electrochemical device according to this invention.

In FIG. 2, a single cell preassembly is illustrated as being wound by mandrel means (not shown) on center core 14c and itself, to form a single spiral cell membrane. Alternatively, FIG. 5 illustrates four separate cell preassemblies 70a, 70b, 70c and 70d that are simultaneously wound from center core 74c and on one another, to form a cell membrane 80 of four overlying spirals. The multiple cell preassemblies approach can also be used with different numbers of preassemblies, such as two or three, with a correspondingly similar number of overlying spirals. The advantages of this construction include reducing the number of preassembly turns needed to form a full size cell membrane disc, and reducing the number of tight radii of curvatures needed when initially starting each spiral.

Figures 13, 14:
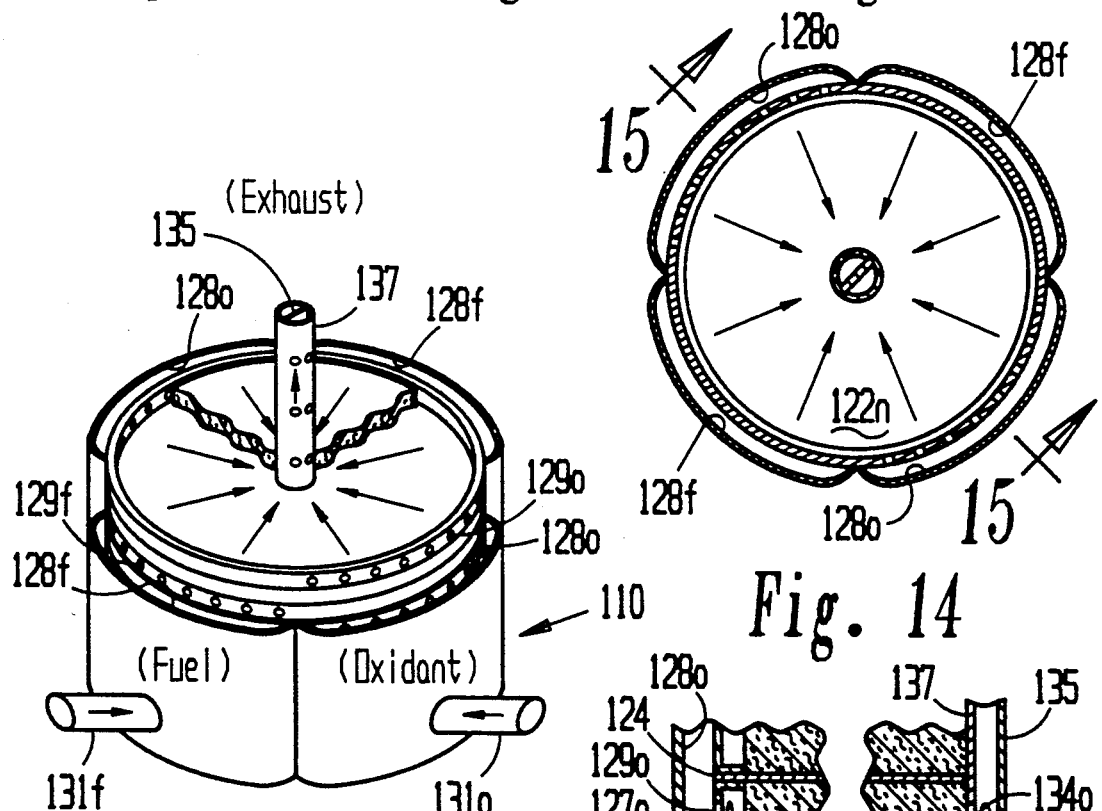
FIG. 13 is a perspective view showing a bipolar fuel cell type electrochemical device formed according to the invention.
FIG. 14 is a top view of the electrochemical device of FIG. 13.
Figure 15:
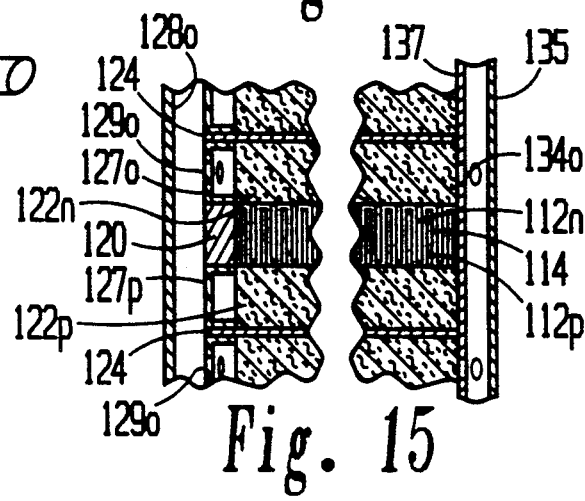
FIG. 15 is an enlarged sectional view, taken generally from line 15—15 in FIG. 14.

The same cell preassembly and spirally wound cell membrane configuration can be used in forming fuel cells, as disclosed in FIGS. 13, 14 and 15. The illustrated fuel cell 110 is comprised of a plurality of stacked cells, each cell being defined by a cell membrane 120, sandwiching porous electrode and/or electrode compartments 122n and 122p, and sandwiching current collectors or interconnects 124, etc., and external positive and negative terminals (not shown) connected to the current collectors.

The D. M. Kotchick U.S. Pat. No. 4,816,036 issued Mar. 28, 1989 and entitled Fabrication of Ceramic Trilayers for a Monolithic Solid Oxide Fuel Cell teaches extruding and layering materials to form a fuel cell somewhat related to that discussed herein, and is incorporated herein for such common disclosure. The patent also illustrates cell manifolding for the fuel and gas reactants.

Figures 12A, 12B, 12C:
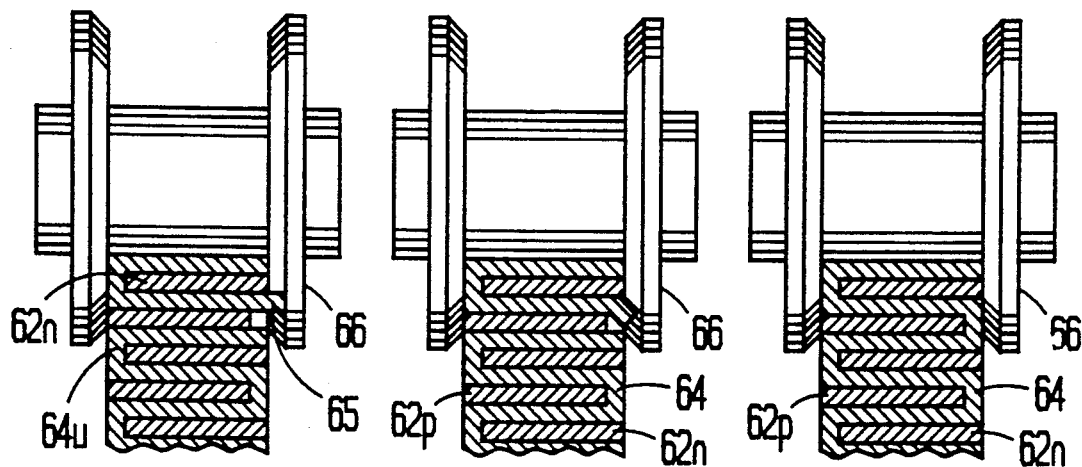
FIGS. 12a, 12b and 12c are enlarged sectional views, showing the components as formed generally at line 12—12 in FIG. 9, and slightly downstream therefrom.

In the disclosed fuel cell 110, each laminate cell membrane 120 is generally configured as in FIGS. 1, 8 and 12c, having overlapping and opposed positive and negative electrodes 112p and 112n separated by serpentine separator/electrolye means 114. The fuel cell 110 would be comprised of many cell membranes 120, sandwiching electrode compartment discs 122n and 122p, and sandwiching current collectors or interconnects 124, sealed at the peripheries thereof in appropriate seals 127f and 1.27o. Separate manifolds 128f and 128o having respective inlet lines 131f and 131o for fuel and oxidant gases overlie circumferentially spaced portions of the stacked and sealed fuel cell body. Openings 129f or 129o in the peripherial seals 127f or 127o respectively communicate the fuel or oxidant manifolds 128f and 128o with only the respective anode or cathodes electrode compartments 122n or 122p.

The separate gas electrode and electrode compartments 122n and 122p in the disclosed fuel cell would be porous, allowing the passage of the reactant fuel or oxidant gases therethrough. Additionally, the electrode and/or the adjacent sandwiching current collector or interconnect 124 may be embossed at its surface to form shallow valleys and small ridges or the like (neither being shown), whereby the valleys also define routing paths for the reactant gases for providing efficient fuel cell operation. The separator/electrolyte 114 is gas impervious, but ion-conductive.

The fuel and oxidant gases follow the radial flow paths inwardly from the manifolds to a central outlet stack 137. Openings (only 134o being illustrated) are in the fuel cell body at central inner stack 137, providing an outlet for upwardly exhausting reactant gases from the anode electrode compartments. Like openings (not shown) vent the cathode electrode compartments via the stack. The fuel and oxidant gases simultaneously react at the electrode/electrolyte interfaces, to provide for generation of both heat and electrical power. The reactant gases are separately exhausted via the illustrated stack 137; while the partition 135 could be eliminated to allow reactant gas commingling in the stack and combined reactant gas discharge.

The discharge of the heated reactant gases upwardly within the central inner stack 137 may create a natural convection or chimney effect for moving the reactant gases through the fuel cell body and away from their reaction therewith. The sprial configuration of the cell membrane may be used also to define the gas flow paths.

In the cell operation, the generated cell output voltage declines as fuel is consumed and the chemical activity is reduced. For example, cell voltages decrease rapidly as hydrogen becomes depleted from the fuel gas to less than 5% concentration. A practical fuel cell may consume only approximately 50-90% of the fuel gas. The above-noted radial flows of the fuel and oxidant gases converge into progressively smaller volumns, increasing both flow velocities and turbulances as the gases approach their weakest concentrations near the outlet stack.

This accelerated reactant gas flow to and from the electrochemical interfaces generally will tend to increase the apparent chemical activity, compared to gas flow through uniform gas flow passages. The increased chemical activity provides improved output voltages and greater fuel cell efficiencies, tending to counteract the normally reduced overall fuel chemical activity that takes place between the gas flow inlets and outlets. The chimney effect moreover reduces gas flow power distribution requirements and/or losses, providing yet further anticipated efficiencies.

EXAMPLES OF THE INVENTION

Example 1. Battery formed without Thermal Processing

A lithium/polymer electrolyte bipolar battery may be comprised of lithium (Li) anode electrodes; titanium sulfide ($TiS_2$) with an electron-conductive polymer such as polypyrole cathode electrodes, and polyethylene oxide based polymer (PEO) electrolyte/separator. The cell preassembly ribbon may be built up by individually and sequentially painting with stencil guides, etc. the components on the underlying cell preassembly while being coiled on a mandrel. Each component ribbon may be 0.05 mm thick; and each electrode may be 0.95 mm wide and the electrolyte may be 1.00 mm wide overall with the 0.05 mm wide double thick staggered end portions, to define a cell preasssembly 1.00 mm wide and 0.20 mm high. Coiling the cell preassembly (with the PEO face out) on itself 200 times would form a 1 mm thick 80 mm diameter cell membrane disc. The electrode components as sized would radially overlap and oppose one another over approximately 0.90 mm. A 0.25 mm thick 80 mm diameter lithium foil disc may be applied to the lithium side of the cell membrane, while a 0.5 mm thick 80 mm diameter $TiS_2$ layer may be applied to the cathode side of the cell membrane. Like subassemblies may be inserted into peripherially containing forms and between adjacent current collectors (of stainless steel, nickel molybdenum or carbon), at least the intermediate ones being bipolar, and sealed to form the battery. A stack of fifty five of such cells would provide a battery having a nominal output of 110 volts.

Example 2. Batteries formed with Thermal Processing

A Na/B "$Al_2O_3$ solid ion bipolar battery may be comprised of sulfur (S) cathodes; sodium (Na) anodes, and B"$Al_2O_3$ electrolyte/separator. The electrolyte/separator component may be tape cast 0.250 mm thick. Electrode compartments can be formed of fibers embedded in a binder/solvent matrix, such as stainless steel fibers forming the cathode compartment for wicking the Na and graphite fibers forming the anode compartment for wicking the S. Each such electrode component would be 1.750 mm wide by 0.25 mm and the electrolyte component would be 4.50 mm wide to provide, when layered and folded, a cell preasssembly 2 mm wide and 1 mm high. This cell preassembly can then be coiled on itself (with the B"$Al_2O_3$ face out) 30 times, being slightly compressed radially and axially between rollers and heated stylus to assure electrolyte contact between adjacent winding layers, to form a 2 mm thick 120 mm diameter cell membrane disc. Thermal treatment at 1,200 degrees C. removes the polymer binder and sinters the cell membrane into a single disc. A 1 mm thick 120 mm diameter disc of sodium is positioned adjacent the stainless steel fibers, a 2 mm thick 120 mm diameter disc of graphite fiber impregnated sulfur is positioned adjacent the graphite fibers, and these components are inserted into and sealed by peripherally containing forms and between adjacent current collectors (of molybdenum). The cell will be operated at temperatures above approximately 350 degrees C., whereupon the electrode materials of sulfur and sodium become liquefied and wick to the impervious electrolyte. At a nominal output of two volts per cell, a stack of fifty five of such cells would provide a battery of 110 volts.

A Na/B "$Al_2O_3$/$NiCl_2$ cell may be formed in a like manner, by substituting nickel fibers for the carbon fibers, by replacing the sulfur with an $NiCl_2$ electrode compartment holding a 2 mm thick 120 mm diameter disc of sintered Ni and NaCl powders, and with liquid $NaAlCl_4$ electrolyte infiltrated.

A lithium-alloy/metal sulfide battery may be formed with the positive electrodes comprised of lithium alloy (lithum aluminum, LiAl); the negative electrodes comprised of iron sulfide (FeS or $FeS_2$); and the separator/electrolyte comprised of 25% magnesium oxide (MgO), infiltrated with 75% lithium chloride, lithium bromide, potassium bromide (LiCl-LiBr-KBr); and such can be made by tape casting or extruding these as ribbon-like components 0.15 mm thick, with the separator or electrolyte ribbon being 5.35 mm wide and each of the electrode ribbons being 2.35 mm wide. Each active component may be carried in a polyisobutylene binder, at about a 2-5% wt concentration. The formed cell preassembly would be 2.50 mm wide by 0.60 mm high, and 100 windings thereof would provide a 2.5 mm thick 120 mm diameter cell membrane disc. Rollers and/or heated stylus and/or solvent would be used to slightly compress the disc radially and axially to provide sound contact of the adjacent layers or particularly to seal the edges of adjacent layers of the separator/electrolyte. This cell membrane disc can be heated in an Argon atmosphere to 400 degrees C., to remove the binder by depolymerizaton, resulting when cooled in a rigid fused disc. To complete the cell, a 3 mm thick 120 mm diameter disc (from cold-pressed composite powders) of the FeS or $FeS_2$ and electrolyte and a 4.5 mm thick 120 mm diameter disc of the composite Li-alloy and electrolyte are disposed respectively against the correspondingly exposed faces of the ceil membrane disc, and these components are sealed by peripherially containing forms and between adjacent current collectors (of molybdenum or TiN-coated steel) compatable with the molten-salt electrochemistries. A stack of sixty nine of such cells operated at 425 degrees C. would provide a battery of 110 volts.

Example 3. Electrostatic Bipolar Capacitor

The capacitor would be formed from polymeric films having good dielectric properties based on a polyvinylidene fluoride (PVDF). A 0.025 mm thick film of PVDF 2.05 mm wide can serve as the separator, and aluminum films 0.025 mm thick by 0.975 mm wide can serve as the electrodes (the aluminum may be vapor deposited on the same or different PVDF film). The cell preassembly 0.1 mm by 1 mm is formed with each alternate aluminum film edge exposed to the opposite side, and rolled by a mandrel 100 times, with the PVDF film face out. Roller, stylus or solvent means would be used to seal the adjacent PVDF layer edges. Aluminum current collectors, and like cell membrane assemblies can be stacked and sealed within peripherially containing forms to define the capacitor; and a stack of twenty such cells would develop a 10 KV storage capacitor.

Example 4. Fuel Cell formed without Thermal Processing

A solid polymer electrolyte/separator (or PEM protron exchange membrane) fuel cell can be fabricated with a perfluorocarbon cation exchange membrane (such as sold by DuPont under the trademark of NAFION 120 or 117) used as the electrolyte/separator, initially formed as a 0.050 mm by 2.15 mm ribbon, and two porous electrode strips each 0.050 mm by 0.95 mm and of a polymer matrix 20% Pt/80% C having a surface density of 1.0 mg/cm. This cell preassembly may alternatively be formed by the sequentially applied paint stenciling method. The formed cell preassembly 0.20 mm by 1.0 mm, may be rolled with the NAFION film out around an inner ring member of 10 mm I.D., to have 350 turns yield a 1 mm thick 150 mm diameter laminate membrane disc. Roller or stylus contact assures intimate contact between the material layers and particularly seals the interface between the electrolyte material edges of adjacent layers. Similarly shaped annular discs each 0.025 mm thick of electrode materials are applied against the respective sides of the cell membrane. The electrodes are gas pervious (while the electrolyte/separator portion of the cell membrane is gas impervious) and graphite current collectors may have suitable facial guides formed thereon for establishing gas distribution passages for the reactant gases via the electrodes to the electrochemical interfaces at the cell membrane. Like cell membrane assemblies and current collectors can be stacked and sealed by peripherially containing forms to define the fuel cell. With reactant gases such as hydrogen and oyxgen, the cell would operate at 100 degrees C. to deliver 0.7 volts at about 1 amp/cm of NAFION; whereby a one hundred fifty seven cell stack would provide a 110 volt output.

Example 5. Fuel Cell formed with Thermal Processing

A solid oxide fuel cell (SOFC) may have the electrolyte/separator formed by oxide-conducting ceramic yltria-stabilized zironia (YSZ); the cathode formed by strontium-doped lanthanum manganite ($Sr_{0.15}La_{0.85}MnO_3$); and the anode formed by a cermet of nickel and YSZ. These materials are matched to provide thermal expansion coefficients sufficiently similar to withstand the wide temperature swings encountered during operation of the cell. Each component can be formed as a 0.05 mm thick ribbon by tape casting, and a cell preassembly 0.2 mm by 1 mm would be formed by layering 0.95 mm wide ribbons of the electrodes on a 2.15 mm wide ribbon of the electrolyte, except it then would be wound around a ring member of 10 mm I.D. Roller, heated stylus and/or solvent means would be used to assure intimate contact between the material layers, particularly for sealing the electrolyte edges between adjacent layers. A 1 mm thick 90 mm diameter annular cell membrane disk may be formed with 200 separate turns. Alternatively, the cell membrane may be formed by sequentially flame-spraying the 200 turns of four passes directly onto the forming mandrel. Annular electrode material sheets 0.025 mm thick are applied against the respective sides of the cell membrane, and the assembly is sintered at 1500 degrees C. to remove the binder system and become densified. The interconnect or biplar current collectors can be lanthanum chromite ($LaCrO_2$) or nickel coated with a noble metal such as platinum or gold, and like cell membrane assemblies and current collectors can be stacked and sealed by peripherially containing forms to define the fuel cell body. The electrodes are gas pervious (while the electrolyte/separator of the cell membrane is gas impervious), and the current collectors are provided with suitable facial guides for defining gas passages for delivering reactant gases to the electrodes for electrochemical reaction at the interfaces. With reactant gases such as hydrogen and oyxgen, the fuel cell stack having one hundred fifty seven cells and operating at 1000 degrees C. would deliver a 110 volt output.

By way of summary of this invention, the electrodes overlap and oppose one another over the major portion of the axial thickness of the laminate cell membrane disc, over all but approximately twice the thickness of the separator/electrolyte, which zig-zags in a serpentine manner between the electrodes. The positive and negative electrodes are alternatively arranged whereby each is electrically common with only one of the paired current collectors respectively and is extended primarily transverse or even perpendicular thereto.

The component layers of the disclosed cell preassembly may be of very thin ribbon-like cross-sections, less than 1 mm and more typically between 0.01–0.5 mm. The electrodes may oppose and overlie one another over small lengths, more typically between 1–3 mm, and the formed cell preassembly and coiled cell membrane are quite narrow, typically less than 3 mm. The opposing electrodes thus overlie one another over lengths at least several times and up to approximately sixty times the thickness of the separator/electrolyte means interposed therebetween.

The disclosed cell membrane configurations provide interfacial area "A" between the adjacent positive and negative electrodes, far greater by an enhanced area ratio "EAR" than the planar area of either adjacent current collector.

Using the cell preassembly height "h" and width "w" dimensions, a formulation for the enhanced area ratio may be represented as $EAR = 2w/h$ ; whereby a cell preassembly having a width "w" of 2 mm and a height "h" of 0.2 mm would provide an enhanced area ratio "EAR" of approximately 20. By contrast, attempts to overlap electrodes by using corrugations may provide a maximum "EAR" of approximately 2, due in part to fabrication limitations including the allowable minimum thickness of the component layers and the consequential tearing of thin layers at the corners. Electrochemical devices formed with cell membranes configured according to this invention thus generate significant outputs, compared to a given cell cross-sect. ±on and existing technologies.

While specific values have been listed n the above disclosures, it will be understood that these are nominal and slight variations can be made therefrom. This pertains to the sizes and compositions of the components, and to the manner of formation of the cells. Accordingly, the invention is to be limited only by the scope of the following claims.

What is claimed as my invention is:

1. An electrochemical device, comprising the combination of housing means, positive and negative terminals exposed separately on said housing means, a plurality of cell means enclosed in the housing means and each having a pair of generally planar current collectors and a cell membrane cooperatively sandwiched therebetween, and means operably connecting the current collectors electrically to the terminals;

each cell membrane being a laminate structure comprised of positive and negative electrodes and separator/electrolyte means interposed therebetween, and the positive and negative electrodes being alternatively arranged whereby each respectively is electrically common with only one of the paired current collectors; and said positive and negative electrodes having surface configurations generally opposing one another and extended in directions primarily transverse to the paired current collectors, and the interposed separator/electrolyte means having a serpentine configuration generally elongated in the direction transverse to the paired current collectors, thereby providing interfacial area "A" between the adjacent positive and negative electrodes greater than the area of either adjacent current collector by a minimum enhanced area ratio of 2.

2. An electrochemical device according to claim 1, further including said positive and negative electrodes in the regions defining the surface configurations being extended in the direction substantially perpendicular to the adjacent paired planar current collectors.

3. An electrochemical device according to claim 1, further including said positive and negative electrodes in the regions defining the opposing surface configurations having ribbon-like cross-sections each of the order between 0.01–0.5 mm thick.

4. An electrochemical device according to claim 1, further including said positive and negative electrodes in the regions defining the opposing surface configurations overlying one another over lengths at least two times and up to approximately sixty times the thickness of the separator/electrolyte means interposed therebetween.

5. An electrochemical device according to claim 4, further including said positive and negative electrodes in the regions defining the opposing surface configurations and the separator/electrolyte means interposed therebetween all having ribbon-like cross-sections of the order between 0.01–0.5 mm thick.

6. An electrochemical device according to claim 5, further including the positive and negative electrodes in the regions defining the opposing surface configurations being extended in the direction substantially perpendicular to the adjacent paired planar current collectors.

7. An electrochemical device according to claim 1, further including said positive and negative electrodes in the regions defining the opposing surface configurations overlying one another over lengths between 1–3 mm.

8. An electrochemical device according to claim 1, further including said positive and negative electrodes in the regions defining the opposing surface configurations overlying one another over lengths less than 3 mm and the thickness of the separator/electrolyte means interposed therebetween being less than 1 mm.

9. An electrochemical device according to claim 1, further including each cell membrane being extended generally as a disc substantially parallel to and between its sandwiching pair of current collectors, said positive and negative electrodes having reservoir portions disposed between the cell membrane and the respective electrically similar current collector and extended over substantially the full area thereof, and said positive and negative electrodes at said reservoir portions and in the regions defining the surface configurations being substantially homogeneous and common electrically.

10. An electrochemical device according to claim 1, further including the device being in the form of a fuel cell and the positive and negative electrodes being gas pervious and the electrolyte/separator means being gas impervious, manifolding and gas passage means open to the gas pervious electrodes for delivering gas reactants relative to the cell membranes, the manifolding means being disposed around and communicating with the electrodes adjacent the outer perimeter of the cell membranes, and the gas passage means being formed in part by the cell membranes having an annular shape and defining a central vertically aligned core opening and in part by radial converging gas flow paths extended between the outer manifolding means and the central core opening, providing increasing flow velocities and turbulances of the reactant gases approaching the core opening and upward convective exhausting of heated reactant gases therewithin.

11. An electrochemical device according to claim 1, further with each said cell membrane being made by the method comprising the steps of forming the components thereof including the positive and negative electrodes and the separator/electrolyte means interposed therebetween by sequentially layering each component individually on its adjacent underlying component as thin ribbon-like configurations and winding the layered ribbon-like configurations into a disc, with the wide opposing sides of each component layer being on one another and the narrow sides thereof being adjacent the opposite disc sides, and of sealing alternatively adjacent pairs of layers of the separator/electrolyte means together on each narrow side, for isolating each of the alternatively arranged positive and negative electrodes, respectively from one of the disc sides while allowing the same electrode to be exposed on the opposite disc side.

12. An electrochemical device according to claim 11, further made by the method of winding the layered ribbon-like configurations on a center core means and the underlying components thereof as a single spiral cell membrane.

13. An electrochemical device according to claim 11, further made by the method of winding the layered ribbon-like configurations on a center core means and the underlying components thereof as multiple spiral cell membrane, each such spiral generally starting from the center core and being simultaneously wound therefrom and on one another.

14. A method of forming a laminate cell membrane for use in an electrochemical device comprising, the steps of forming components thereof including the positive and negative electrodes and the separator/electrolyte means interposed therebetween by sequentially layering each component individually on its adjacent underlying component as thin ribbon-like configurations of the material in pliant form, winding the layered ribbon-like configurations into a disc, with the wide opposing sides of each component layer being on one another and the narrow sides thereof being adjacent the opposite disc sides, and of sealing alternatively adjacent pairs of layers of the separator/electrolyte means together on each narrow side, for isolating each of the alternatively arranged positive and negative electrodes, respectively from one of the disc sides while allowing the same electrode to be exposed on the opposite disc side, whereby said positive and negative electrodes having surface configurations generally opposing one another and extended in directions primarily transverse to the disc and the interposed separator/electrolyte means having a serpentine configuration extended generally between the opposite disc sides, providing interfacial area "A" between the adjacent positive and negative electrodes across the interposed separator/electrolyte means greater than the area of either disc side by a minimum enhanced area ratio of 2.

15. A method of forming an electrochemical device cell membrane according to claim 14, further comprising the steps of forming each layer of the positive and negative electrodes and the interposed separator/electrolyte means in the regions defining the opposing electrode surface configurations of a thickness between 0.01–0.5 mm and having the opposing electrode surface configurations overlying one another over maximum lengths between 1–3 mm.

16. A method of forming an electrochemical device cell membrane according to claim 15, further comprising the steps of initially forming a cell preassembly having a single pair of positive and negative electrodes and separator/electrolyte means interposed therebetween, the cell preassembly having a substantially rectangular cross-section with narrow opposing sides and wide opposing sides, of layering the cell preassembly with one of its wide opposing side disposed on the opposite wide side on another like cell preassembly to provide that said narrow sides of the cell preassemblies then define the opposite cell membrane disc sides.

17. A method of forming an electrochemical device cell membrane according to claim 16, further comprising the steps of layering at least one of the positive and negative electrodes and the separator/electrolyte means on one another while leaving an end edge of one layer projected beyond the end edge of the other layer, and of folding the projected end edge layer into overlying relationship relative to the other end edge.

18. A method of forming an electrochemical device cell membrane according to claim 15, further comprising the step of extruding, spraying, painting or stenciling the positive and negative electrodes and separator/electrolyte means on one another sequentially as layers, while moving the underlying component therepast.

19. A method of forming an electrochemical device cell membrane according to claim 15, further comprising the steps of thermally processing the cell membrane at an elevated temperature for a duration sufficient to set the materials.

20. A method of forming an electrochemical device comprising, the steps of providing laminate cell membrane discs each having components thereof including positive and negative electrodes and separator/electrolyte means interposed therebetween, each component individually being of a thin ribbon-like configuration and the components cooperating with one another with the wide opposing sides thereof overlying one another and with the narrow sides thereof adjacent the opposite disc sides, and alternatively adjacent pairs of layers of the separator/electrolyte means on each narrow side isolating each of the alternatively arranged positive and negative electrodes respectively from one of the disc sides while allowing the same electrode to be exposed on the opposite disc side, thereupon the electrodes having surface configurations generally opposing one another and extended in directions substantially perpendicular to the disc and the interposed separator/electrolyte means having a serpentine configuration extended generally between the opposite disc sides, providing interfacial area "A" between the adjacent positive and negative electrodes across the interposed separator/electrolyte means greater than the area of either disc side by a minimum enhanced area ratio of 2; providing positive and negative electrode material discs and current collector discs of approximately the same sizes as the cell membranes; assemblying each cell membrane in a sandwiched relationship between the electrode material discs and the current collector discs in sealed association within housing means, said electrode material discs thereby being disposed immediately adjacent and homogeneous with and electrically similar to its adjacent current collector disc and extended over substantially the full area thereof and with said respective positive and negative electrodes in the regions defining the surface configurations.

* * * * *